(12) United States Patent
Zeng

(10) Patent No.: US 11,860,015 B2
(45) Date of Patent: Jan. 2, 2024

(54) MEASUREMENT OF FLARE GAS FLOW RATE BY INFRARED CAMERA

(71) Applicant: Yousheng Zeng, Baton Rouge, LA (US)

(72) Inventor: Yousheng Zeng, Baton Rouge, LA (US)

(*) Notice: Subject to any disclaimer, the term of this patent is extended or adjusted under 35 U.S.C. 154(b) by 213 days.

(21) Appl. No.: 16/896,101

(22) Filed: Jun. 8, 2020

(65) Prior Publication Data

US 2020/0386596 A1 Dec. 10, 2020

Related U.S. Application Data

(60) Provisional application No. 62/858,779, filed on Jun. 7, 2019.

(51) Int. Cl.
*G01F 1/684* (2006.01)
*G01J 5/00* (2022.01)
*G01J 5/80* (2022.01)

(52) U.S. Cl.
CPC ............ *G01F 1/684* (2013.01); *G01J 5/0014* (2013.01); *G01J 5/80* (2022.01); *G01J 2005/0077* (2013.01)

(58) Field of Classification Search
CPC ........ G01F 1/684; G01F 25/10; G01F 1/6884; G01J 5/0014; G01J 5/80; G01J 2005/0077

See application file for complete search history.

(56) References Cited

U.S. PATENT DOCUMENTS 9,258,495 B2 * 2/2016 Zeng ...................... G01J 5/0806
11,181,375 B2 * 11/2021 Michini ................. G01C 21/20
2013/0342680 A1 12/2013 Zeng

* cited by examiner

*Primary Examiner* — David P Porta
*Assistant Examiner* — Meenakshi S Sahu
(74) *Attorney, Agent, or Firm* — Robert E Bushnell

(57) ABSTRACT

An Infrared (IR) imaging system can be constructed with a spectral range that includes at least a portion of an IR band of $CO_2$ which firstly, enables the system to measure flow rates of flare stack gases that contain hydrocarbons, and secondly, is radiometrically calibrated, thereby assuring that the output for each pixel in images captured by the camera has apparent temperature consistent with the temperature of a blackbody used to calibrate the camera.

11 Claims, 2 Drawing Sheets

MEASUREMENT OF FLARE GAS FLOW RATE BY INFRARED CAMERA

CLAIM FOR PRIORITY

This application makes reference to, and incorporates herein the entirety of my Provisional Application entitled Measurement Of Flare Gas Flow Rate By Infrared Camera, earlier filed in the U.S. Patent & Trademark Office on the 7th of Jun. 2019 and there regularly assigned Ser. No. 62/858,779.

FIELD OF THE INVENTION

This invention relates to an apparatus and a method to measure flow rates of vent gases that are fed to industrial flare stacks.

BACKGROUND

Flare stacks are commonly used at industrial facilities (e.g., oil and gas extraction and production sites, gas processing plants, oil refineries, and petrochemical manufacturing plants) to safely dispose of process gases (which are typically waste gases) which must be vented into atmosphere due to process upset or because they are unrecoverable for technical or economic reasons. The gases sent to flare stacks are combustible, and generally include hydrocarbons and other air pollutants. Environmental and safety regulations prohibit discharge of such waste gases into the atmosphere without having been treated by a flare stack because of the potential fire hazard and negative effects on human health and the environment. Flare stacks are designed to destroy the waste gases by combusting them into harmless or less harmful gases (e.g., hydrocarbons being combusted into water vapor and carbon dioxide).

When waste gases reach the tip of a flare stack, a pilot flame positioned at the tip ignites the gases. With oxygen from ambient air, the waste gases are combusted and destroyed. The combustion efficiency of the flare stack can be affected by flare operating conditions and environmental factors. As a result, the degree of destruction of the waste gases can vary depending on the flare stack's combustion efficiency. If the combustion efficiency can be monitored and the result can be provided in feedback to the flare stack operators, the operators may be able to adjust the operating conditions to improve the flare's combustion efficiency and reduce the air emissions. Conventional extractive air emission testing and monitoring methods can not be used to measure the performance of flares because the flaring process occurs in open air.

Apparatus suitable to measure the combustion efficiency of flare stacks may be found in U.S. Pat. No. 9,258,495 B2, issued on 9 Feb. 2016 from an application assigned Ser. No. 13/850,832, for a Multi-spectral Infrared Imaging System For Flare Combustion Efficiency Monitoring.

The apparatus found in U.S. Pat. No. 9,258,495 can be used to measure flare combustion efficiency; some embodiments of the present invention can be used to measure the flow rate of gases being fed to the flare stack. Furthermore, the combination of flare combustion efficiency measured by the apparatus described in U.S. Pat. No. 9,258,495 and flare gas flow rate measured in the practice of the present invention can be used to calculate the volumetric or mass emission rate of the air pollutants, which are the unburned portions of those waste gases that are vented to flares.

SUMMARY OF THE INVENTION

The practice of the principles of present invention contemplates a radiometrically calibrated Infrared (IR) camera that is used to measure, from a standoff distance, the IR spectral radiance from the flare stack which is subject to the flow rate measurement. The IR spectral radiance is proportional to the heat released (as that heat is released and is measured, for example, in British Thermal Unit per hour, or Btu/hr) from the combustion of the waste gases. The heat released from the flare stack is proportional to the mass, or volumetric flow rate, of the gases sent to the flare stack and combusted by the flare stack. The IR camera should be radiometrically calibrated by using common calibration procedures (e.g., calibration against a blackbody instrument at a temperature that is within the range of the flares' flame temperatures). The IR camera may be either a multi-spectral imager or a single spectral imager. The spectral window (or windows) of the IR camera should include the IR bands of a primary constituent in the combustion products.

In most instances of industrial flare stacks, the flare stack's discharged gases include hydrocarbons and the primary combustion products of hydrocarbons include carbon dioxide ($CO_2$) and water vapor. Although both water vapor and $CO_2$ exist in the atmosphere and can cause interference to the IR radiance measurement, the interference caused by the presence of atmospheric $CO_2$ is much less than, and more consistent than, that of water vapor; and is therefore more predictable in comparison to the interference that is attributable to atmospheric water vapor. Thus, it is most advantageous to have an IR camera that has a spectral window covering at least a portion of an IR band of $CO_2$.

The IR spectral radiance measured by the IR camera can be expressed in watts per steradian per square meter per hertz ($W \cdot sr^{-1} \cdot m^{-2} * Hz^{-1}$) or watts per steradian per square meter per wavelength ($W \cdot SR^{-1} \cdot m^{-2} \cdot \mu^{-1}$). For a fixed spectral window of the IR camera, the measurement can also be made in radiance as watts per steradian per square meter ($W \cdot sr^{-1} \cdot m^{-2}$). By using the IR camera optical design specifications and distance from the flare to the IR camera, the steradian and surface area of the flare stack's flame can be calculated and the measured radiance can be reduced to watts, which is the power output by the flare in the wavelength covered by the IR camera (hereafter referred to as spectral power).

The spectral power measured by the radiometrically calibrated IR camera can be expressed as watts. It can be converted to Btu/hr (1 W=3.412142 Btu/hr), which is more commonly used by energy and process industries. The flare stack's spectral power output is a fraction of the total power output due to the combustion of the flame's gases, and it is proportional to the total power output from the flame. The total power output (e.g., Btu/hr) from the flame is directly related to the net heating value of combustion of the flame's gases (e.g., Btu/lb) and the flow rate of the flame stack's gases (e.g., lb/hr). The net heating value of combustion is an intrinsic property of a given gas or gas mixture. Therefore, the spectral power measured by the IR camera can be used to measure the flare stack's gas flow rate.

BRIEF DESCRIPTION OF THE DRAWINGS

A more complete appreciation of the principles of the invention, and many of the attendant advantages thereof, will be readily apparent as the same becomes better under-

DETAILED DESCRIPTION

Figure 1:
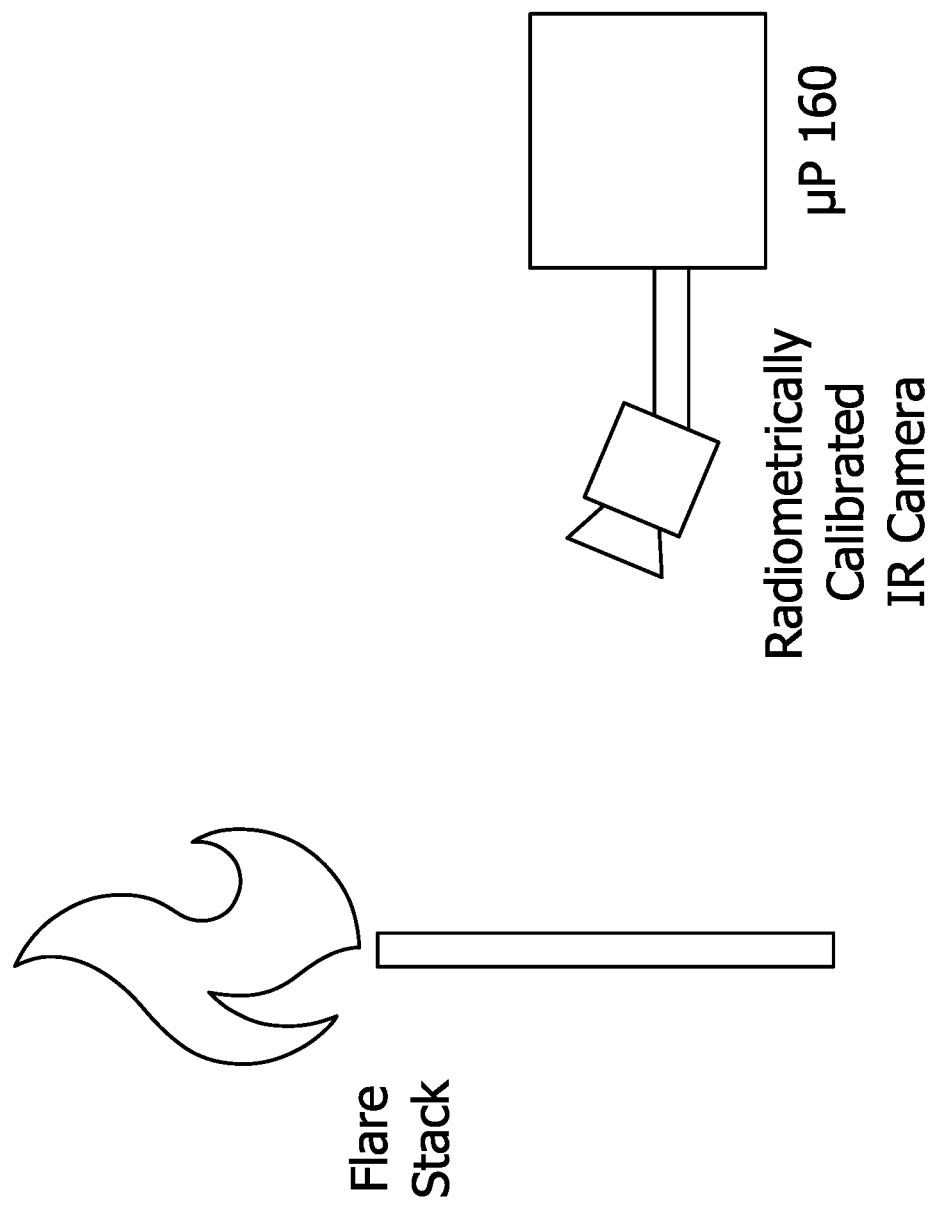

FIG. 1 shows a setup arranged to measure the flare stack gas flow rate by using a radiometrically calibrated IR camera.

Figure 2:
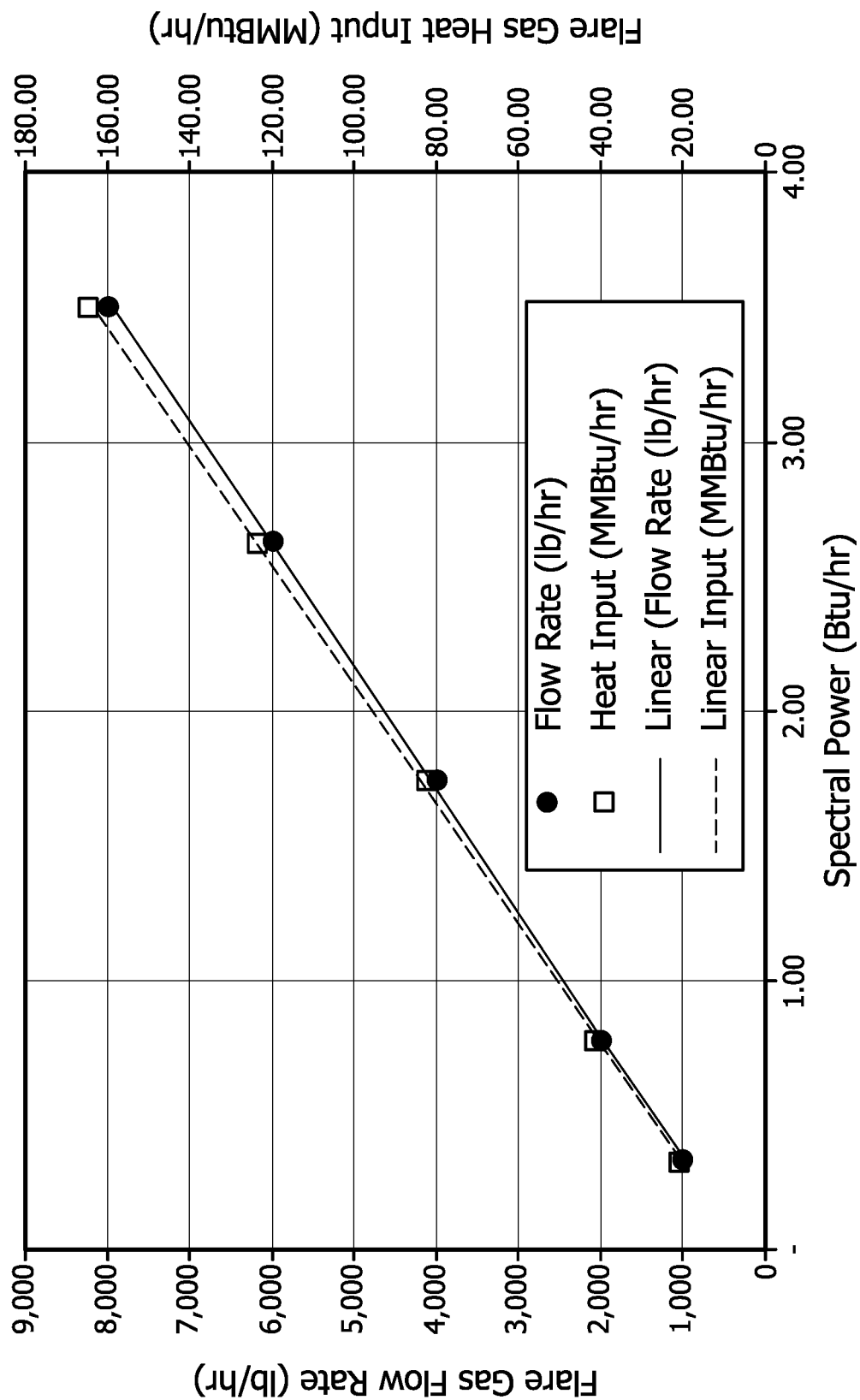

FIG. 2 is a calibration curve illustrating the relationship between the spectral power (Btu/hr) measured by a radiometrically calibrated IR camera and the flare stack's gas flow rate (lb/hr).

DETAILED DESCRIPTION

Turning now to the drawings, principles for the practice of the present invention will now be described more completely with reference to the accompanying Figures, in which exemplary embodiments for the practice of those principles of this invention are shown.

In the practice of the present invention, the essential imaging apparatus would be an IR camera that meets the following two minimum requirements: firstly, its spectral range must include at least a portion of an IR band of $CO_2$ if the apparatus is intended to measure flow rates of flare stack gases that contain hydrocarbons; and secondly, the imaging apparatus must be radiometrically calibrated, meaning that the output for each pixel in the images captured by the camera is apparent temperature consistent with the temperature of a blackbody used to calibrate the camera. The radiometric calibration can be accomplished via attached microcontroller, namely micro-processor μP 160 as shown in FIG. 1, by employing the same procedures used to calibrate thermography IR cameras, provided that the temperature range of the blackbody should be closer to the apparent temperature expected in a portion of flare stack's flame (e.g., 700 degree C.). The apparent temperature readings from the IR camera can be converted to IR radiance values (e.g., expressed in the unit of $W \cdot sr^{-1} \cdot m^{-2} \cdot \mu^{-1}$ or $W \cdot sr^{-1} \cdot m^{-2}$) by using the Planck Equation.

Provided that the IR camera meets the minimum requirements described in the foregoing paragraphs, the specifications for the IR camera are flexible. For example, the camera can be a mid-wave or long-wave camera, either cooled or uncooled, and either single spectral or multispectral IR camera. The measurement sensitivity will be better if a cooled IR camera is used. As driven by its micro-processor 160, a multispectral IR camera can provide additional information about flare stack combustion, and with the assistance of micro-processor 160, that information may be used to further characterize the flare stack operations and refine the results. An example of such a refinement would be to account for the small portion of unburned hydrocarbons based on the flare's combustion efficiency determined such as when using the principles described in U.S. Pat. No. 9,258,495 B2.

To measure flow rate of gas fed to a flare stack, the IR camera should be placed at such a distance from the flare stack that the entire flare's flame's thermal footprint is captured within the camera's field of view with no objects interposed between the flame and the camera that might block IR radiance from the flare stack to the camera.

One measurement of the flare spectral power can be made by using one complete IR image (one frame) captured by the camera and the following equations:

$$P = 3.412142 \cdot (IFOV \cdot d)^2 \cdot \Sigma_{i,j} R_{i,j} \qquad \text{Eq. (1)}$$

where,

P is spectral power in Btu/hr,

IFOV is Instantaneous Field of View in radians. IFOV represents the angle that a single detector pixel can cover. In this example, it is assumed that a pixel represents a square in the scene and the vertical IFOV and horizontal IFOV are equal.

d is the distance from the flare to the camera measured in meters, and $R_{i,j}$ is radiance in $W \cdot s^{-1} \cdot m^{-2}$ measured by the pixel in row i and column j of the camera pixel array.

The indices i and j run from 1 to n in rows, and 1 to m in columns on the camera's pixel array.

If the output of the radiometrically calibrated IR camera is in the form of apparent temperature, $T_{i,j}$ for pixel (i,j), the term $R_{i,j}$ in Eq. (1) can be calculated by Planck's Equation:

$$R_{i,j} = \frac{2hc^2}{\lambda^5} \cdot \frac{1}{e^{\frac{hc}{\lambda k T_{i,j}}} - 1} \qquad \text{Eq. (2)}$$

where, h is Planck's constant ($6.626 \times 10^{-34}$ J·s), c is the speed of light ($2.998 \times 10^{-8}$ m/s), k is the Boltzmann constant ($1.381 \times 10^{-23}$ J/K), and λ is the effective wavelength, in meters, that correspond to the wavelength used during the radiometric calibration against a blackbody.

The radiance measured by the IR camera and the calculated spectral power, P, per Eq. (1) represents a fraction of the total heat released from flare combustion. The fraction is determined by the spectral window of the IR camera with respect to the entire electromagnetic spectrum. The total heat released from the flare's combustion is determined by Eq. (3) below:

$$H = NHV \cdot Q \text{ or} \qquad \text{Eq. (3)}$$
$$Q = \frac{H}{NHV}$$

where,

H is the total heat released from the flare's combustion in Btu/hr,

NHV is the net heating value of the flare gas in Btu/lb, and

Q is the flow rate of flare gas in lb/hr.

The relationship between the spectral power P and the total heat output H or flare stack gas flow rate Q is to be established by a calibration process. The calibration is accomplished by a setup illustrated in FIG. 1 where multiple levels of flare gases with known flow rates Q and net heating values NHV are sent to a flare, the radiance from the flare is measured, and the spectral power P is calculated with Eq. (1) for each flare stack gas flow rate, and a calibration curve is generated. Based on the calibration curve, a calibration equation can be established:

$$H = a \cdot P + b \text{ or} \qquad \text{Eq. (4)}$$
$$Q = \frac{1}{NHV}(a \cdot P + b)$$

Where a and b are constants for the linear fit equation of the calibration data. Ideally b should be equal to zero. The constant a may be influenced by multiple factors such as flare stack type (steam assisted, air assisted, pressure assisted, or non-assisted flares), the level of assist, and the orientation of the flare flame in relation to the camera line of sight. If the flare gas NHV in a particular application, including a composition-weighted average NHV for a flare gas that is a mixture of multiple gases, is unknown and can not be estimated, the flare stack gas flow rate will be measured and expressed as Btu/hr.

By way of example of Eq. (4), FIG. 2 is a calibration curve illustrating the relationship between the spectral power P (Btu/hr) measured by a radiometrically calibrated IR camera and the flare stack gas flow rate Q (lb/hr). In this case, the distance between the flare and the IR camera is 410 feet. The flare stack gas is natural gas with an average net heating value (NHV) of 20,555 Btu/lb. With this NHV, the flow rate of the flare stack's gas may be converted to the total heat output by multiplying the flow rate Q (lb/hr) by the NHV (Btu/lb), and the result will be the heat output in units of Btu/hr, which can be converted to units of millions of Btu per hour (MMBtu/hr) as is shown as the secondary vertical axis in FIG. 2.

The calculation procedures described above and associated constants will be stored in a machine readable storage medium internal or external to the flare stack flow measurement apparatus, and the result of measured flare stack gas flow rate, either expressed as mass flow rate (e.g., lb/hr) or as total heat output (e.g., Btu/hr), can be displayed or stored for the end user of this flare stack flow rate measurement system.

What is claimed is:

1. An imaging system, comprising:
   a radiometrically calibrated infrared (IR) camera having a spectral window, disposed at a standoff distance from a flare stack, to measure a flow rate of waste gas or liquid being fed to the flare stack, in dependence upon IR spectral radiance emanating from a flame of combustion emitted from the flare stack; and
   an analysis apparatus driven by a microcontroller µP, coupled to the camera to operationally respond in real time to representations of the spectral radiance provided to the camera by the flame of combustion of the flare stack, by generating an indication of the flow rate to the flare stack.

2. The imaging system of claim 1, further comprised of the spectral window of the IR camera covering full or partial IR bands of a primary constituent in the flame of combustion.

3. The imaging system of claim 1, further comprised of the IR camera having the spectral window covering at least a portion of an IR band of $CO_2$.

4. The imaging system of claim 1, further comprised of output from each pixel of images captured by the IR camera exhibiting an apparent temperature consistency with a temperature of a blackbody used to calibrate the camera.

5. The imaging system of claim 2, further comprised of output from each pixel of images captured by the IR camera exhibiting apparent temperature consistency with a temperature of a blackbody used to calibrate the camera.

6. The imaging system of claim 3, further comprised of output from each pixel of images captured by the camera exhibiting apparent temperature consistency with a temperature of a blackbody used to calibrate the camera.

7. An imaging process, comprised of:
   positioning a radiometrically calibrated infrared (IR) camera having a spectral window at a standoff distance from a flare stack, to measure a flow rate of waste gas or liquid being fed to the flare stack, in dependence upon IR spectral radiance emanating from a flame of combustion emitted from the flare stack; and
   operationally responding in real time to representations of the spectral radiance provided to the camera by the flame of combustion at the flare stack, by generating an indication of the flow rate to the flare stack.

8. The imaging process of claim 7, further comprised of constructing the IR camera with a spectral window covering full or partial IR bands of a primary constituent in the flare combustion products.

9. The imaging system of claim 7, further comprised of constructing the IR camera with a spectral window covering at least a portion of an IR band of $CO_2$.

10. The imaging system of claim 7, further comprised of constructing the IR camera with output from each pixel of images captured by the camera exhibiting apparent temperature consistent with a temperature of a blackbody used to calibrate the camera.

11. The imaging system of claim 7, further comprised of constructing the IR camera with output from each pixel of images captured by the camera exhibiting apparent temperature consistent with a temperature of a blackbody used to calibrate the camera.

* * * * *